Aug. 28, 1956  G. A. WATROUS  2,760,744
STANDARD CONSTRUCTIONS
Filed March 31, 1951
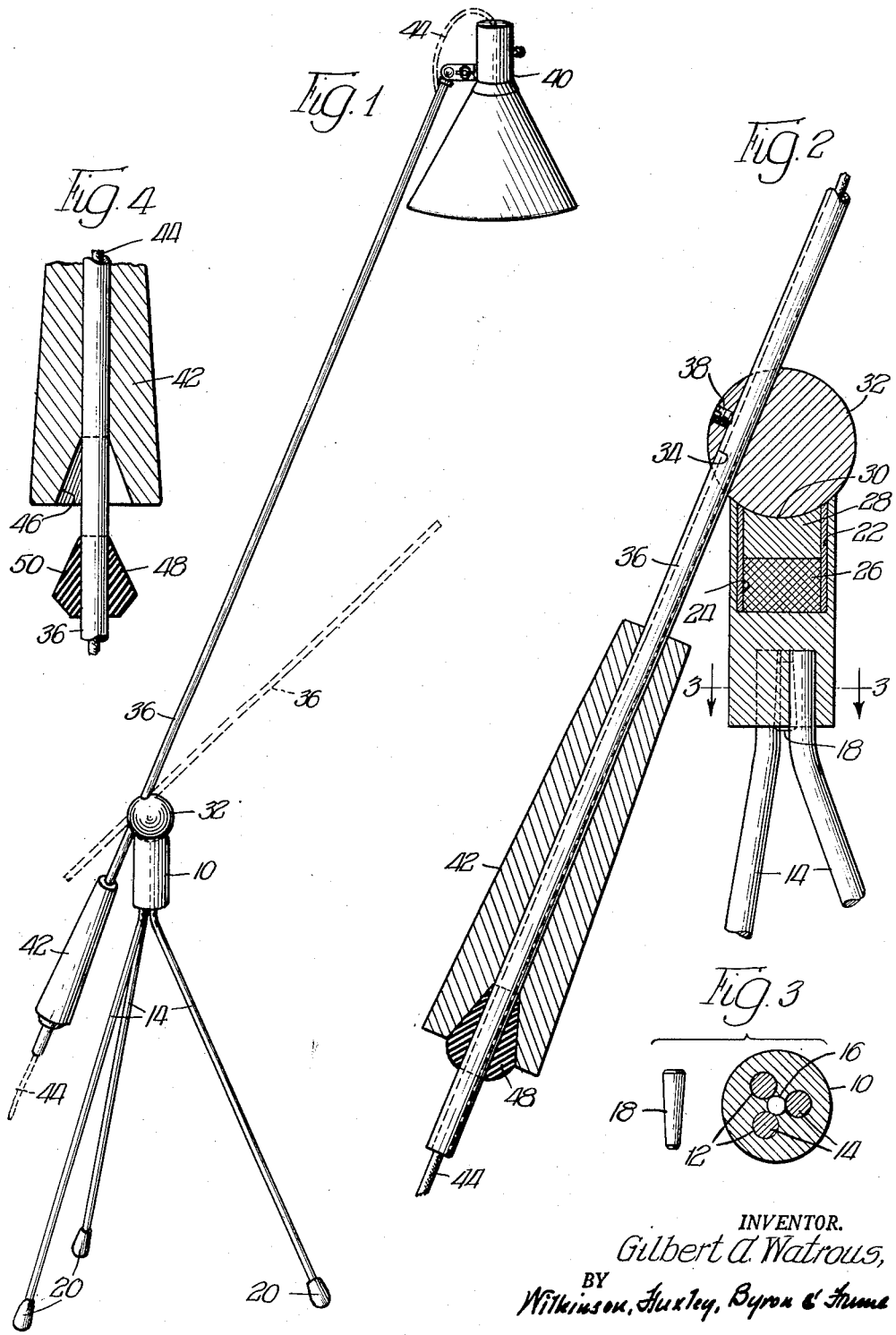
INVENTOR.
Gilbert A. Watrous,
BY
Wilkinson, Huxley, Byron & Hume
ATTYS.

United States Patent Office 2,760,744
Patented Aug. 28, 1956

2,760,744

STANDARD CONSTRUCTIONS

Gilbert A. Watrous, Chicago, Ill.

Application March 31, 1951, Serial No. 218,648

3 Claims. (Cl. 248—122)

This invention relates to a supporting standard of general application, and one which is especially well adapted for supporting lamps and similar devices, the elevation and attitude of which in respect to a supporting surface may be varied.

One of the objects of the invention is to provide a standard that is simple in construction and easily adjustable to various attitudes, while being sturdy and readily portable.

The form of the invention adopted herein for purposes of illustration is embodied in a lamp, although the invention is not limited thereto, since it employs a cantilever arm principle which may be used to support other devices, such as radio microphones, in an adjustable manner.

In the drawings—

Figure 1 is a perspective view of one form of the invention;

Figure 2 is an enlarged elevational view of certain details of the device, some of the parts being shown in section;

Figure 3 is a sectional view taken along line 3—3 of Figure 2, with one of the parts removed and shown in side elevation; and Figure 4 is an enlarged fragmentary mid-sectional view of one of the details shown in Figure 2 and corresponding therewith.

Referring now to the drawings in greater detail, the standard is comprised of a cylindrical portion 10, which is formed of magnetic material, such as iron or steel. As shown in Figure 3, the bottom of the cylinder 10 is provided with bores 12. A central bore 16 is provided axially of the cylinder 10 so as to overlap and communicate with the bores 12 at their proximate portions. The result is a trefoil opening which extends for a substantial distance axially of the cylinder 10, as may be seen in Figure 2.

The legs 14, which may be solid or hollow, are closely fitted in the bores 12, and a tapered wedge 18 is driven into the central bore 16 to bind the several parts together. The legs 14 are splayed as shown in Figure 1 to constitute a tripod which may be provided with suitable anti-slip pads 20 at the foot of each leg. Additional bores and legs may be provided as desired.

The upper portion of the cylinder 10 is provided with a countersink 22, which extends for a substantial distance into the body of the cylinder coaxially therewith. The countersunk portion 22 is lined with a paramagnetic sleeve or liner 24 which is co-extensive with the depth of the countersink. Within the paramagnetic sleeve, which may be made of brass or similar non-magnetic material, there is disposed adjacent to the bottom of the countersink a permanent magnet 26, such as those commonly referred to as "Alnico," which affords the maximum magnetic field and the greatest magnetic retentivity for the size of the magnet involved. The magnet 26 fills the countersink 22 approximately to one-half of its depth and leaves room for the accommodation of an insert 28 of magnetic material, such as soft iron or steel, which is of an outside diameter approximately corresponding to the internal diameter of the paramagnetic liner 24.

The top of the assembly, including the upper portions of the cylinder 10, and the corresponding portions of the liner 24, and the magnetic insert 28, are finished to a concave spherical surface 30, which affords a seat for a steel or iron magnetic ball 32, as appears in Figure 2. The magnetic flux emanating from the permanent magnet 26 passes through the magnetic body of the cylinder 10, through the ball, and through the magnetic insert 28, to constitute a closed magnetic path around the paramagnetic liner 24, the force of which keeps the magnetic ball 32 firmly in the concave seat 30 on top of the cylinder 10.

The ball 32 is provided with an eccentric bore 34, through which a cantilever arm 36, preferably, though not necessarily, a metal rod or tube, passes in close fitting sliding engagement therewith. The wall of the ball is tapped along a radius which passes through the axis of the bore 34 so as to accommodate a set-screw 38, which is screwed against the rod or tube 36 to anchor it in relation to the ball in any desired position.

The upper extremity of the cantilever arm 36 may be provided with lamp fittings 40, which may be of conventional design, or may be otherwise equipped to hold any other instrument at its extremity, e. g., a microphone, camera, etc., as may be desired.

At its opposite end, the rod or tube 36 is provided with a counterweight 42, which comprises an elongated member of generally cylinder form, through which a coaxial bore 44 extends for the accommodation of the member 36. At its lower extremity, the counterweight 42 is relieved coaxially of the bore 44, as at 46, so as to impart to the latter a flared opening for the accommodation of a rubber binding ferrule 48, which is disposed about the rod or tube 36 as appears in Figures 2 and 4.

The conical surfaces of the ferrule 48 are provided with a complementary taper 50 to that of the flared portion 46 for registration therewith, as shown in Figure 2. When in this relationship, the ferrule 48 is caused to bind upon the rod 36 by co-action between the tapered surfaces 46 and 50, which precludes the counterweight 42 from slipping axially of the cantilever arm 36 from any given setting.

From the foregoing, it will be seen that the angular position of the rod or tube 36 on the standard 10 may be adjusted to any desired position, as is indicated by the broken lines in Figure 1. There is afforded limited universal movement between the parts supported by the ball 32 and the cylinder 10. In addition, the effective length of the cantilever arm 36 may be varied in relation to its support by adjusting the set-screw 38 to permit the member 36 to be moved in relation to the ball to any desired setting, upon the attainment of which the set-screw may be tightened to retain the adjustment.

The counterweight 42 is adjusted axially of the arm 36 approximately to balance the assembly in the selected position. The magnet assists in maintaining the position of the arm 36 in whatever attitude it is ultimately disposed, but its primary function is to prevent accidental displacement of the ball 32 from its seat on the cylinder 10.

As shown in connection with the lamp, and as applies to a microphone, or other electrical device, the arm 36 will preferably be a tube, through which an electric wire 14 may be passed to connect the fixture 40 at the top of the assembly with any suitable source of electrical energy.

The arm 36 with its attachments may be removed and used apart from the base portion, and the latter may be conveyed to any location of reassembly and ultimate use while the member 36 is so removed.

I claim:

1. Support structure for lamps, microphones, and the like, comprising a base, a concave seat on said base, a magnet underlying said seat, a magnetic ball mounted for universal movement in said seat and held therein by said magnet, an elongated standard slidably mounted intermediate its ends in said ball, means for connecting a device to be supported on said standard at one side of said ball, an axially slidable counterweight carried on said standard at the other side of said ball to balance the associated structure in the seat upon the base.

2. A standard for lamps, microphones, and the like, which comprises a cylindrical base, legs supporting said base connected to its lower portions, a concave socket carried upon an upper surface of said base, a magnet within said base underlying said socket, a ball freely seated in said socket in movable and removable relationship thereto and being retained therein by said magnet, a cantilever arm slidably mounted between its ends in said ball, means for loosening and tightening the connection therebetween to adjust the axial disposition of said arm with respect to said ball, and a counterweight carried by said arm to one side of said ball for maintaining the center of gravity of said arm and associated parts in or closely adjacent to said ball, said counterweight being axially adjustable on said arm.

3. A standard for lamps, microphones, and the like, comprising a base of magnetic material having a hollow portion at its top, a magnet disposed in said portion, a socket of magnetic material overlying said magnet therein, a magnetic ball carried in said socket to define a universal joint, a cantilever arm slidably mounted through said ball so as to have universal movement with respect to said base, means for varying the effective moment arm of said cantilever with respect to said ball, a counterpoise slidably mounted on said cantilever arm to maintain it and its associated parts in any desired position with respect to said base, and means to adjustably secure said counterpoise to said arm.

References Cited in the file of this patent

UNITED STATES PATENTS

| | | |
|---|---|---|
| 169,383 | Starr | Nov. 2, 1875 |
| 2,144,197 | Nirdlinger | Jan. 17, 1939 |
| 2,299,683 | Curtis | Oct. 20, 1942 |
| 2,453,967 | Browne | Nov. 16, 1948 |
| 2,510,634 | Hull | June 6, 1950 |

OTHER REFERENCES

Moore, Abstract of S. No. 615,908, vol. 631, p. 585, O. G. Feb. 14, 1950.